United States Patent
Zavalkovsky et al.

(10) Patent No.: US 7,716,721 B2
(45) Date of Patent: May 11, 2010

(54) METHOD AND APPARATUS FOR RE-AUTHENTICATION OF A COMPUTING DEVICE USING CACHED STATE

(75) Inventors: Arthur Zavalkovsky, Netanya (IL); Alexey Kobozev, Rishon LeZion (IL); Joseph Salowey, Seattle, WA (US); Ilan Frenkel, Tel-Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 875 days.

(21) Appl. No.: 11/253,960

(22) Filed: Oct. 18, 2005

(65) Prior Publication Data

US 2007/0101406 A1    May 3, 2007

(51) Int. Cl.
*H04L 29/00* (2006.01)
*H04L 29/02* (2006.01)

(52) U.S. Cl. ............... 726/2; 726/3; 726/4; 726/5; 726/6; 726/7; 726/8; 726/9; 726/10; 713/155; 713/156; 713/182; 713/183; 713/184; 713/185; 709/225

(58) Field of Classification Search ............ 713/159; 726/8, 10
See application file for complete search history.

(56) References Cited

U.S. PATENT DOCUMENTS

| | | | |
|---|---|---|---|
| 6,377,691 B1 * | 4/2002 | Swift et al. ............ | 380/277 |
| 7,295,831 B2 * | 11/2007 | Coleman et al. ......... | 455/410 |
| 7,370,350 B1 * | 5/2008 | Salowey ................ | 726/7 |
| 7,458,095 B2 * | 11/2008 | Forsberg .............. | 726/3 |
| 2002/0002688 A1 * | 1/2002 | Gregg et al. ........... | 713/202 |
| 2003/0074580 A1 * | 4/2003 | Knouse et al. .......... | 713/201 |
| 2003/0212887 A1 * | 11/2003 | Walther et al. ......... | 713/151 |
| 2004/0153555 A1 * | 8/2004 | Haverinen et al. ...... | 709/229 |
| 2004/0168054 A1 | 8/2004 | Halasz et al. | |
| 2005/0132030 A1 * | 6/2005 | Hopen et al. .......... | 709/223 |
| 2006/0277596 A1 * | 12/2006 | Calvert et al. ......... | 726/3 |
| 2007/0033643 A1 * | 2/2007 | Rossi et al. ........... | 726/10 |
| 2007/0118890 A1 * | 5/2007 | Song ................... | 726/8 |
| 2008/0126545 A1 * | 5/2008 | Hopen et al. .......... | 709/226 |
| 2008/0212783 A1 * | 9/2008 | Oba ................... | 380/279 |
| 2009/0262718 A1 * | 10/2009 | Meier et al. ........... | 370/338 |

OTHER PUBLICATIONS

M. Chiba, et al., "Dynamic Authorization Extensions to Remote Authentication Dial in User Service (RADIUS)", Memo, Network Working Group Request for Comments: 3576, dated Jul. 2003, 30 pgs.

(Continued)

*Primary Examiner*—Syed A. Zia
(74) *Attorney, Agent, or Firm*—Hickman Palermo Truong & Becker LLP

(57) ABSTRACT

Automatically re-authenticating a computing device seeking access to a network or a resource. A method comprises forwarding a request received from the computing device to an authentication device to enable the authentication device to authenticate the computing device using a full-authentication mechanism. State information related to authenticating the computing device is created from authenticating the computing device. The state information is received and stored. For example, an authenticator device that forwarded the initial authentication request from the computing device to the authentication device receives and stores the state information. The computing device is re-authenticated using the stored state information without again contacting the authentication device.

25 Claims, 8 Drawing Sheets

OTHER PUBLICATIONS

N. Cam-Winget, et al., "EAP Flexible Authentication Via Secure Tunneling (EAP-FAST)", Memo, Internet Draft dated Feb. 9, 2004, located at "http://www.faqs.org/ftp/pub/internet-drafts/draft-cam-winget-eap-fast-00.txt", retrieved on Jan. 30, 2006, 65 pgs.

H. Haverinen, et al., "Extensible Authentication Protocol Method for GSM Subscriber Identity Modules (EAP-SIM)", Memo, Network Working Group Internet Draft dated Dec. 21, 2004, located at http://www.potaroo.net/ietf/all-ids/draft-haverinen-pppext-eap-sim-16.txt, retrieved on Jan. 30, 2006, 81 pgs.

Cisco Systems, "Cisco Trust Agent 2.0", Data Sheet, copyright 1992-2005, Cisco Systems, 6 pgs.

Prasad, Anand R. et al "Next Generation Communications and Secure Seamless Handover" Security and Privacy for Emerging Areas in Communication Networks 2005 Workshop of the $1^{st}$ International Conference on Atthens, Greece, Sep. 5-9, 2005, Piscataway, NJ, USA, IEEE, Sep. 5, 2005 pp. 261-268, XP010890047.

Extended European Search Report, dated Jun. 29, 2009, Application No. EP 06825918, Applicant Cisco Technology, Inc., 7 pages.

Claims, Application No. EP 06825918, 3 pages, Oct. 11, 2006.

* cited by examiner

METHOD AND APPARATUS FOR RE-AUTHENTICATION OF A COMPUTING DEVICE USING CACHED STATE

FIELD OF THE INVENTION

The present invention generally relates to authenticating computing devices that communicate over a network, including wireless and landline networks. The invention relates more specifically to a method and apparatus for re-authentication of a computing device using saved state information.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computing devices that access resources over a network are commonly subjected to an authentication process. The authentication process determines whether a device requesting access to the network, or to a particular resource, actually is the device that it purports to be. If the device is authenticated, then depending on its identity, role, and other policy data, the device may be permitted to access the network, or selected resources within the network.

Wireless local area networks such as those that use an 802.1x protocol for wireless communications now commonly use some form of user authentication protocol. For example, Extensible Authentication Protocol (EAP), as defined in IETF RFC 2284, may be used. In EAP over LAN authentication, a wireless client device, such as a laptop computer, that is seeking to obtain network access is termed a supplicant. An AAA server provides user authentication services to an access device or authenticator, typically a router, which intercepts requests of the supplicant; the access device has the role of a client with respect to the AAA server.

Providing authentication services with an AAA server, or the like, allows centralization of policy decisions. Moreover, having a centralized AAA server avoids attacks from access points. However, performing authentication involves communicating numerous messages between the supplicant and the AAA server. If the supplicant requires re-authentication, the same process with multiple round-trip messages is used. This is time-consuming and computationally expensive. As a result, this approach is undesirable for mobile devices that frequently cross boundaries of wireless networks.

This approach is particularly unworkable because re-authentication can be triggered by numerous events. For example, re-authentication is typically required whenever the supplicant device is powered up or rebooted, when a user logs off the supplicant device, when the supplicant device is moved to a new access point, or when the supplicant device moves in and out of range of an access point. In addition, partial or unintended authentication may take place if the supplicant device is temporarily or transiently brought in or out of range of an access point.

Based on the foregoing, there is a clear need for an improved method for re-authenticating devices in networks. There is a specific need for an improved method for efficiently re-authenticating devices that use wireless networks. There is also a need for an approach for efficiently re-authenticating supplicant devices that use wireless networks that eliminates performing unnecessary round-trip messages whenever re-authentication is needed. There is also a need for an approach that can reduce processing and network load on the authentication infrastructure.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
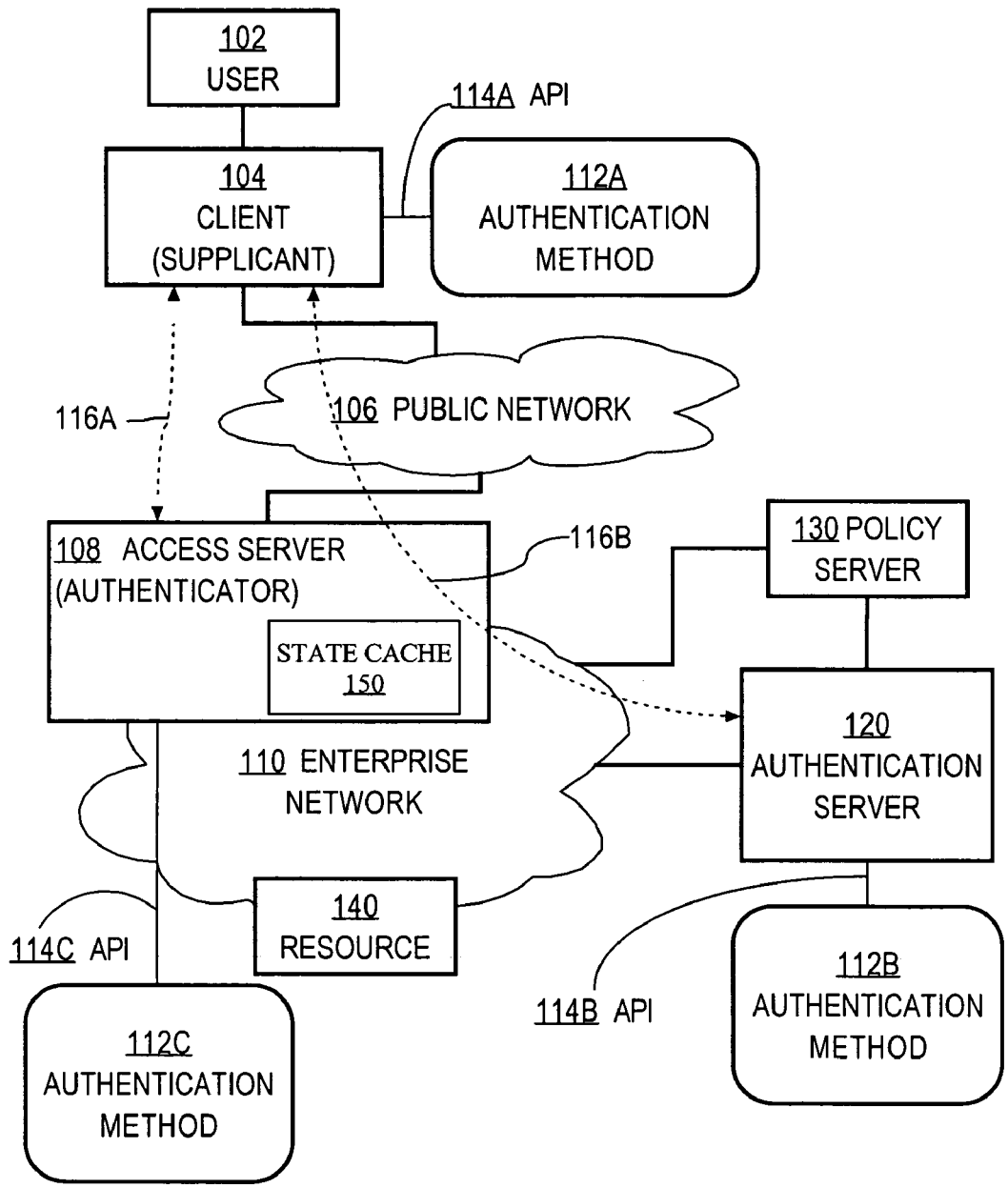
FIG. 1 is a block diagram that illustrates an overview of a network in accordance with an embodiment.

A method and apparatus for re-authenticating a computing device is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Method of Re-Authenticating a Computing Device Using Cached State
    2.1 Structural Overview
    2.2 Functional Overview
    2.3 Exemplary Message Flow
    a) Initial Authentication
    b) Re-Authentication for Resumed Session
    c) Re-Authentication for Same Session
    2.4 Updating Policies on Access Server
  3.0 Implementation Mechanisms: Hardware Overview
  4.0 Extensions and Alternatives 1.0 General Overview The needs identified in the foregoing Background, and other needs and objects that will become apparent for the following description, are achieved in the present invention, which comprises, in one aspect, a method of automatically re-authenticating a computing device seeking access to a network or resource. In this aspect, the method comprises forwarding a request received from the computing device to an authentication device to enable the authentication device to authenticate the computing device using a full-authentication mechanism. State information related to authenticating the computing device is created from authenticating the computing device. The state information is received and stored. For example, an authenticator device that forwarded the initial authentication request from the computing device to the authentication device receives and stores the state information. The computing device is re-authenticated using the stored state information without again contacting the authentication device. For example, the authenticator device re-authenticates the computing device without again contacting the authentication device. The re-authentication may be performed with a fast-authentication mechanism. Herein, a fast-authentication mechanism is one that uses information saved from a previous (e.g., full) authentication in order to simplify the re-authentication.

In one feature, the re-authenticating the computing device comprises the authenticator device determining if it has valid state information for the computing device stored thereon.

In other aspects, the invention encompasses a computer apparatus and a computer-readable medium configured to carry out the foregoing steps.

In another aspect, the invention comprises an apparatus for re-authenticating a computing device over a network. The apparatus comprises a network interface that is coupled to the network for receiving one or more packet flows therefrom; a processor; and a computer readable medium. The computer readable medium has stored thereon one or more sequences of instructions which, when executed by the processor, cause the processor to carry out the steps of: receiving a request for authentication from the computing device; determining if cached state information that is usable for a re-authentication of the computing device is stored in the computer readable medium; responsive to a determination that the cached state information is not stored in the computer readable medium, forwarding the authentication request to an authentication device; and responsive to a determination that the cached state information is stored in the computer readable medium, authenticating the computing device using the cached state information, wherein the authentication is performed with the re-authentication mechanism.

2.0 Method of Re-Authenticating a Computing Device Using Cached State at an Authenticator Device 2.1 Structural Overview FIG. 1 is a block diagram that illustrates an example network arrangement in which an embodiment can be used. A user 102 is associated with a client 104 that is communicatively coupled to a public network 106 and indirectly communicatively coupled to an enterprise network 110. In the terminology of the RFC that describes EAP, a client system seeking authentication and network access is termed a "supplicant," and in this description client 104 is such a supplicant. Client 104 may execute, for example, the 802.1x supplicant available from Microsoft. An access server 108, or AAA client, controls access to enterprise network 110, in cooperation with authentication server 120. The access server 108 is termed an AAA client because authentication server 120 services authentication requests of the access server. The access server 108 is also referred to herein as an authenticator device. The access server 108 is substantially compliant with an authenticator in an 802.1x architecture, in one embodiment.

Client 104 is any network-compatible end station, such as a personal digital assistant (PDA), cellular telephone, personal computer, or workstation. Network 106 may be any local area network, wide area network, or one or more internetworks. Enterprise network 110 is any network, including a WLAN, that holds one or more network resources 140 that client 104 is seeking to access. In certain embodiments, networks 106, 110 may be the same; thus, FIG. 1 is intended to broadly encompass any network arrangement in which an untrusted client 104 is seeking access to a resource 140 that is held in a secure network.

Access server 108 is, in one embodiment, a network router that is configured to perform access control functions. The EAP-compliant embodiments described herein may be implemented using any EAP-capable platform, including switches, routers, network elements that support VPN, wireless gateways, firewalls, etc.

Authentication server 120 is a computer that is configured to securely store user authentication information such as usernames and passwords, and to perform authentication protocols, algorithms, and supporting processes, such as one-time password (OTP) validation, encryption and decryption, message digest evaluation, etc. In one embodiment, authentication server 120 communicates with access server 108 using a secure protocol that is optimized for use in authentication. An example of a suitable protocol is RADIUS. The authentication server 120 is substantially compliant with an authentication server in an 802.1x architecture, in one embodiment.

Optionally a policy server 130 is communicatively coupled to network 110 and/or to authentication server 120, or is integrated with the authentication server 120. The policy server 130 provides a repository of authentication policies that the authentication server 120 may consult to determine how to interact with client 104. For example, policy server 130 may specify a minimum required authentication method that client 104 must be capable of using for authentication, a particular kind of credential that the client must present in addition to completing successful authentication, etc.

In this arrangement, client 104 may initially authenticate itself to access server 108, in cooperation with authentication server 120, to gain access to resource 140. Any of several authentication protocols may be used to perform authentication. Exemplary suitable authentication protocols include, but are not limited to, EAP-TLS, PEAP, EAP-SIM, and EAP FAST. More generally, any authentication protocol may be used for which there is an authenticator device and an authentication device and for which state is maintained between a first authentication and a second authentication. The first authentication may be a full authentication and the second authentication may be a fast authentication.

In an object-oriented environment, logic that defines messages and actions performed as part of the authentication protocol can be structured as an authentication method 112A that client 104 accesses or calls using an application programming interface (API) 114A. A compatible authentication method 112B is callable by authentication server 120 using API 114B.

In general, under EAP, when client 104 attempts to access enterprise network 110, access server 108 contacts the client and requests identity information, which the client provides in a response. Thus, client 104 and access server 108 establish a logical connection 116A. Access server 108 is able to pass subsequent messages involved in the authentication protocol, and issued by client 104, to authentication server 120, and to forward related messages directed from the authentication server to the client. Accordingly, client 104 and authentication server 120 effectively establish a logical connection 116B until the authentication protocol terminates. As a result, authentication server 120 can use authentication method 112B to determine its authentication behavior since it represents the logical endpoint of the authentication protocol conversation.

The access server 108 is configured to re-authenticate the client 104 using state information from the initial authentication. After the authentication server 120 completes the initial authentication, the authentication server transfers the state information to the access server 108. The access server 108 stores the state information in the state cache 150. The state information may be used in a re-authentication of the client 104 without repeated contact with the authentication server 120, in one embodiment. The access server 108 is able to perform at least some of the authentication protocol used by the authentication server 120. In an object-oriented environment, logic that defines messages and actions performed as part of the re-authentication protocol can be structured as an authentication method 112C that the access server 108 accesses or calls using an application programming interface (API) 114C.

Thus, re-authentication can take place between the client 104 and access server 108 entirely on logical connection 116A. However, during re-authentication with the access server 108, the client 104 need not be aware of whether the access server 108 is re-authenticating the client 104 at the access server, or the access server is forwarding messages to the authentication server 120 for authentication.

For purposes of illustrating a clear example, the following discussion of FIG. 2A-2B, FIG. 3A-3C, and FIG. 4 reference communications among elements of FIG. 1. However, FIG. 1 represents merely one example of a network arrangement, and the techniques described herein may be used in many other network arrangements.

2.2 Functional Overview

Figure 2A:
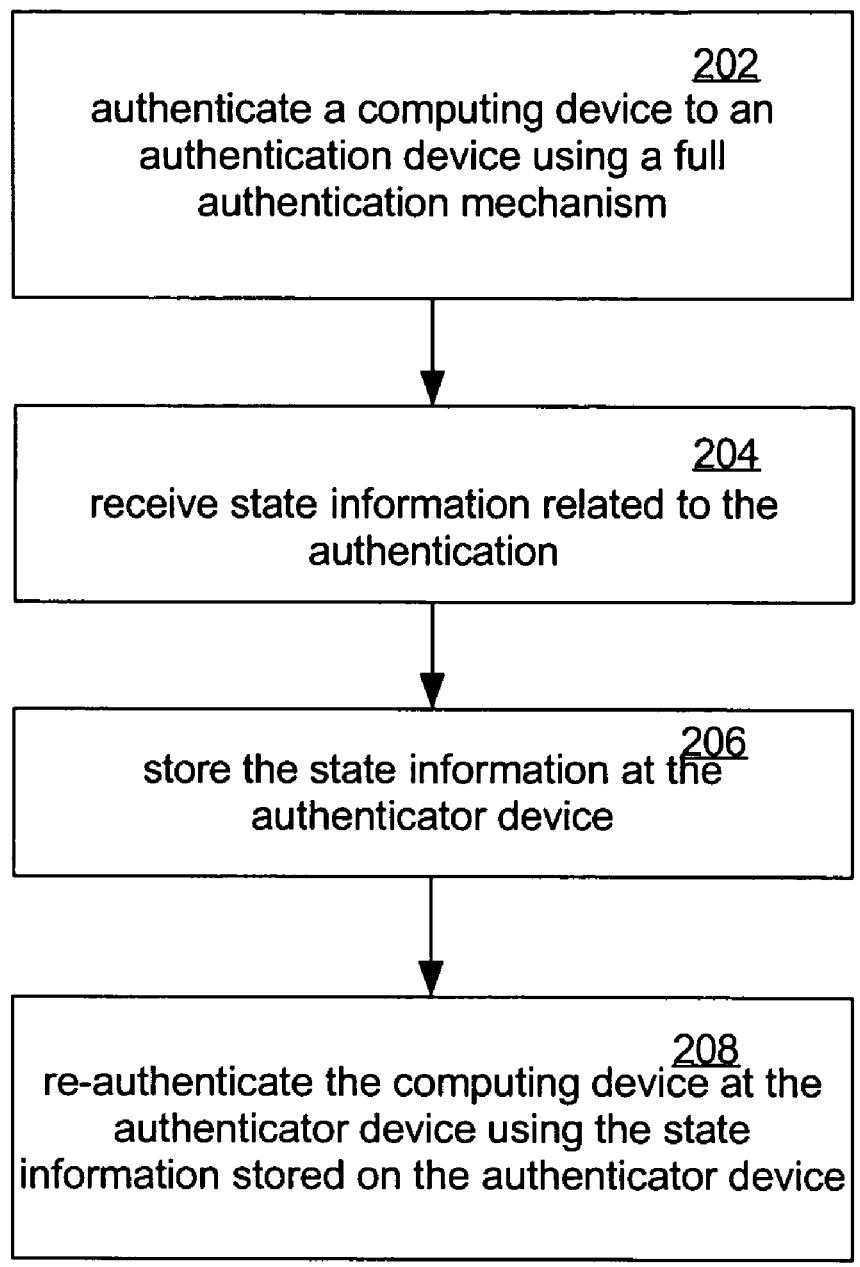
FIG. 2A is a flow diagram that illustrates a high level overview of one embodiment of a method for re-authenticating a computing device.

FIG. 2A is a flow diagram that illustrates a high level overview of one embodiment of a method for re-authenticating a computing device. In block 202, a computing device is authenticated to an authentication device using a full authentication mechanism. For example, in one embodiment, client 104 is authenticated to authentication server 120 using an authentication mechanism in which the client and the authentication server create security materials that can later be used for re-authentication. Herein, the information usable for a re-authentication mechanism is referred to as state information. The state information may include a TLS session ID. For example, the TLS session ID is used in an embodiment that employs PEAP. The state information may also include information contained in PACs (protected access credentials). When EAP-FAST is used a PAC may be used by the client 104 to perform mutual authentication with the authentication server 120 through the access server 108. For example, in an embodiment that uses the EAP-FAST protocol, the state information includes information obtained from PACs.

In block 204, the state information is received at the authenticator device from the authentication device. For example, the authentication server 120 transfers state information to the access server 108. The state information may include a session ID, cryptographic information, and session expiration information. The cryptographic information comprises a Transport Layer Security (TLS) master secret, in one embodiment. The state information may also include authorization information such as access control policies that determine what type of access the client 104 should have to protected resources.

In block 206, the state information is stored at the authenticator device. For example, the access server 108 stores the state information in the state cache 150. However, embodiments are not limited to transferring the state information to and storing the state information on the access server 108. In one embodiment, the state information is transferred to and cached on an entity other than the access server 108 on the network 110 that has knowledge of the active sessions on the network 110.

In block 208, the computing device is re-authenticated at the authenticator device using the state information stored on the authenticator device. The re-authentication may be performed with the re-authentication mechanism described herein As a result, the computing device, such as client 104, is re-authenticated in a streamlined manner without requiring numerous round-trip messages to an authentication server to obtain authentication data. Moreover, the authentication server is not required to maintain state information, which may otherwise require considerable storage as when the authentication server is servicing hundreds or thousands of supplicant devices. Because the authentication server is not required to maintain state information, the authentication server is more reliable and more tolerant to restarts. Moreover, pushing the re-authentication decision from the authentication server to the authenticator relieves the authentication server from unnecessary requests. This unburdening frees the authentication server to handle more complex policy evaluations.

The authentication device may push the state information to more than one authenticator device. For example, the authentication server 120 may push the state information to different network access servers 108 to which the client 104 may roam. This allows the client 104 to re-authenticate with any of the network access servers 108 having the state information. While the authentication server 120 is not required to save the state information, in one embodiment the authentication server 120 does save the state information. This allows the authentication server 120 to push the saved state information to other network access servers 108 if the client 104 should roam, for example.

Figure 2B:
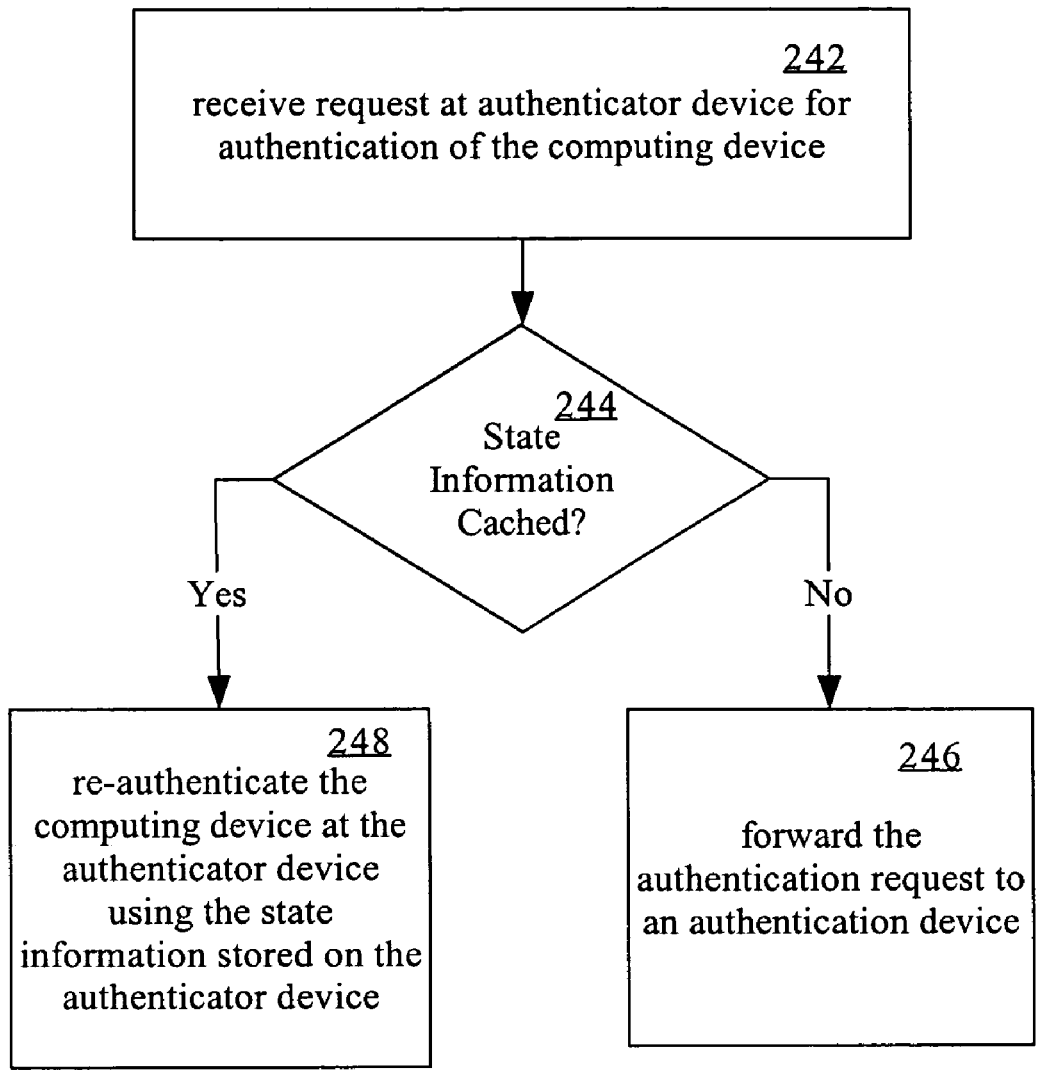
FIG. 2B is a flow diagram that illustrates another embodiment of a method for re-authenticating a computing device.

FIG. 2B is a flow diagram that illustrates a high level overview of another embodiment of a method for re-authenticating a computing device. In block 242, a request is received by an authenticator device for authentication of the computing device. The request may be received by an access server 108 (e.g., AAA client). In one embodiment, the request is received by a device that is compliant with an authenticator in an 802.1x architecture.

In block 244, the authenticator device determines if state information that is usable for a re-authentication mechanism of the computing device is stored at the authenticator device. The state information may include a session ID associated with a previous authentication of the computing device with a device other than the authenticator device. For example, the other device may be an AAA server. The session ID is used to index the state cache 150 to determine if the state information is cached, in one embodiment. Embodiments are not limited to using a session ID to determine if the state information is in the state cache 150. In another embodiment, PACs are used to determine if the state information is in the state cache 150.

The state information may further comprise cryptographic information, as well as expiration information for a session associated with a previous authentication of the computing device. For example, the session ID relates to an initial authentication between client 104 and authentication server 120, with the network access server 108 acting as an intermediary. The cryptographic information comprises a Transport Layer Security (TLS) master secret, in one embodiment.

In block 246, responsive to a determination that the cached state information is not stored at the authenticator device, the authentication request is forwarded to an authentication server. For example, the authentication request is forwarded from the access server 108 to the authentication server 120.

In block 248, responsive to a determination that the cached state information is stored in at the authenticator device, the computing device is re-authenticated at the authenticator device using the state information stored on the authenticator device. The re-authentication may be performed with a fast authentication mechanism.

2.3 Exemplary Message Flows a) Message Flow for Initial Authentication

Figure 3A:
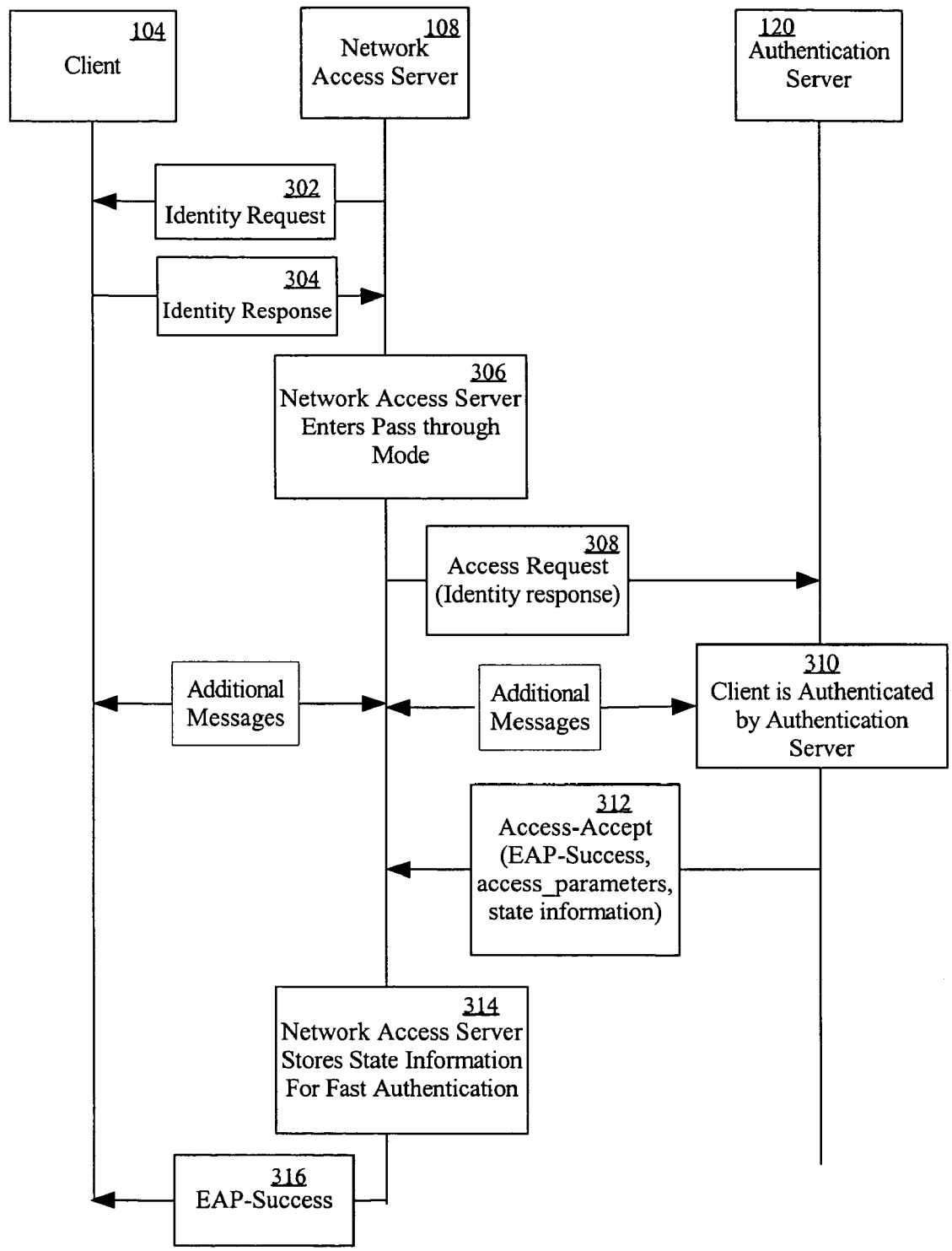
FIG. 3A is a diagram illustrating message transfer in a process of authenticating a computing device, in accordance with an embodiment.

FIG. 3A is a diagram illustrating message transfer and a flow diagram that illustrates another embodiment of a method for re-authenticating computing devices. This process may be used to establish the state information at the authenticator such that a re-authentication can take place later at the authenticator. The process of FIG. 3A typically occurs the first time that the client 104 is authenticated. However, the process can take place regardless of the state of the client device. The embodiment depicted in FIG. 3A passes messages that are substantially compliant with an EAP-TLS protocol. However, the present invention is not limited to the EAP-TLS protocol. More generally, any protocol may be used for which there is an authenticator device and an authentication device and for which state is maintained between a first authentication and a second authentication. The first authentication may be a full authentication and the second authentication may be a fast re-authentication.

In block 302, the network access server 108 sends an identity request to the client 104. In block 304, the network access server 108 receives an identity response from the client 104. In block 306, the network access server 108 enters a pass through mode, wherein the authentication server 120 is actively involved in the authentication of the client 104 and the network access server passes messages between the client and the authentication server. In block 308, the network access server 108 initiates the pass through mode by sending an access request to the authentication server 120, including the identity response that was received from the client 104.

In block 310, the network access server 108 then acts as a relay for additional messages transferred between the client 104 and the authentication server 120 to complete the authentication in accordance with the EAP-TLS protocol. In the pass through mode, the network access server 108 acts as an AAA client to the authentication server 120, in one embodiment.

The authentication server 120 serializes the TLS session and includes it in a message transferred to the network access server 108, in block 312. Serialization involves transforming session data in an abstract data structure into a series of values that can be carried in a payload of a messaging protocol, e.g., a series of TLVs. In block 312, the authentication server 120 further sends an EAP-TLS access-accept message to the network access server 108 indicating that it has completed its authentication of the client 104. The access accept indicates that authentication was successful, provides access parameters, and includes the serialized state information in a portion of the access-accept payload. The state information is related to authenticating the client 104 and is usable for a re-authentication mechanism. The state information may also include a session timeout, which the network access server 108 may use to invalidate the state information associated with the session ID.

It is not required that the state information be transferred in an access accept message. In another embodiment, the state information is transferred to the network access server 108 in any convenient manner responsive to a request from the network access server 108 for the state information. In yet another embodiment, the state information is transferred to the network access server 108 via a Change of Authorization ("CoA") request message from the authentication server 120 to the network access server 108, using the general format defined in RFC 3576. RFC 3576 defines a Change of Authorization message, for the RADIUS protocol, which an AAA server may send to cause an access device to change authorization characteristics for a single supplicant.

In block 314, the network access server 108 stores the state information. This may include storing a session timeout value, such that the network access server 108 can invalidate the session and initiate re-authentication of the client 104.

In block 316, the network access server 108 sends an EAP-Success message to the client 104. This completes the initial authentication of the client 104. Moreover, the network access server 108 is able to use the stored state information for a later re-authentication of the client 104. Optionally, the authentication server 120 can delete the state information it maintains, because the network access server 108 holds a copy.

b) Message Flow for Re-Authentication of Resumed Session

Figure 3B:
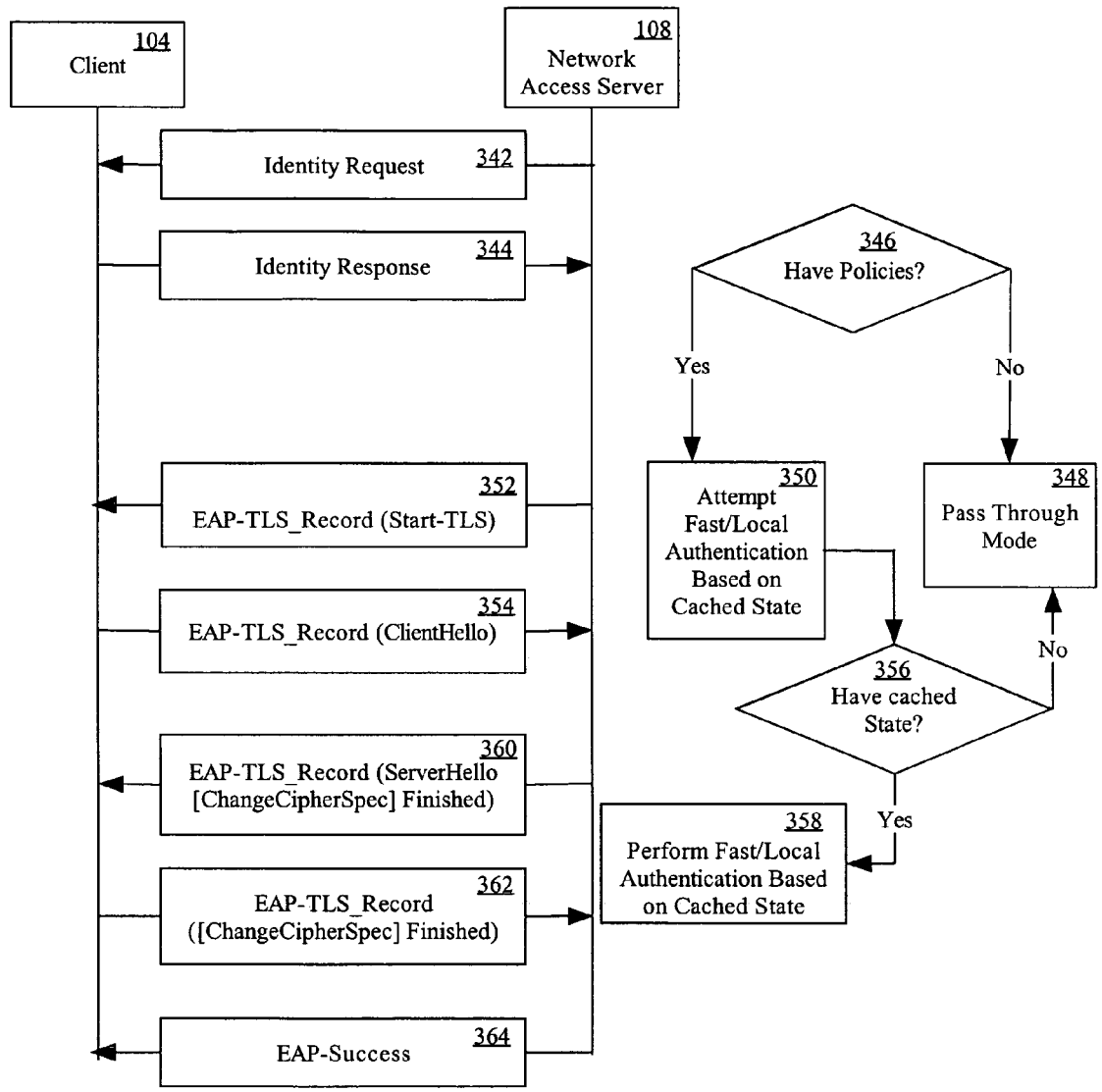
FIG. 3B is a diagram illustrating message transfer in a process of re-authenticating a computing device, in accordance with an embodiment.

FIG. 3B is a flow diagram, including message transfer, that illustrates another embodiment of a method for re-authenticating computing devices. The embodiment depicted in FIG. 3B passes messages that are substantially compliant with an EAP-TLS protocol. However, the present invention is not so limited. The flow diagram of FIG. 3B may be used to resume a session.

In block 342, the network access server 108 sends an identity request to the client 104. The request of block 206 may occur in response to a trigger event that requires re-authentication. For example, if the network access server 108 determines that the session times out, the access server may require that the client 104 re-authenticate. Alternatively, assume that client 104 is powered up or rebooted, or a user logs off the client, the client is moved to a new access point, the client moves in and out of range of an access point, etc. In response to such a trigger event, the network access server 108 informs client 104 that the client needs to re-authenticate.

In block 344, the network access server 108 receives an identity response from the client 104. In block 346, the network access server 108 determines if it has valid policies associated with the identity response. Block 346 is optional. If the network access server 108 does not have the policies, then the network access server 108 enters a pass through authentication mode, in block 348, wherein the authentication server 120 is actively involved in the authentication of the client 104. Details of one embodiment of a pass though mode are depicted in blocks 306-316 of FIG. 3A. The network access server 108 initiates the pass through mode by sending an access request to the authentication server 120, including the identity response, as depicted in block 308 of FIG. 3A.

Referring again to FIG. 3B, in block 350, the network access server 108 initiates a re-authentication to be performed at the network access server 108 responsive to a determination that the network access server 108 has policies for the client device 104 associated with the identity response. The network access server 108 may temporarily store the identity response in case it does not have appropriate state information for re-authentication.

In block 352, the network access server 108 sends an EAP-TLS record message to the client 104 containing a Start-TLS operation. In block 354, the client 104 sends an EAP-TLS record message to the network access server 108 containing a ClientHello.

In block 356, the network access server 108 determines if it has cached state associated with the client 104. For example, the network access server 108 uses the session-ID in the ClientHello to determine if it has the cached state. If the network access server 108 does not have the cached state, the network access server 108 initiates a pass-through mode, in block 348. In an embodiment that uses a protocol other than EAP-TLS, a parameter other than the session ID may be used to determine if the state information is cached.

In block 358, if the network access server 108 does have the state information for the client 104, then the network access server 108 performs the re-authentication using the cached state information, in blocks 360, 362, and 364.

In block 360, the network access server 108 sends to the client 104 a ServerHello message, a ChangeCipherSpec message to reactivate the session's security options, and a Finished message to let the client 104 check the newly activated security options.

In block 362, the client 104 responds with a ChangeCipherSpec message to reactivate the negotiated options, and a Finished message to let the network access server 108 check the newly activated security options.

In block 364, the network access server 108 sends an EAP-Success message to the client 104. This completes the re-authentication performed at the network access server 108.

c) Message Flow for Re-Authentication for Same Session

Figure 3C:
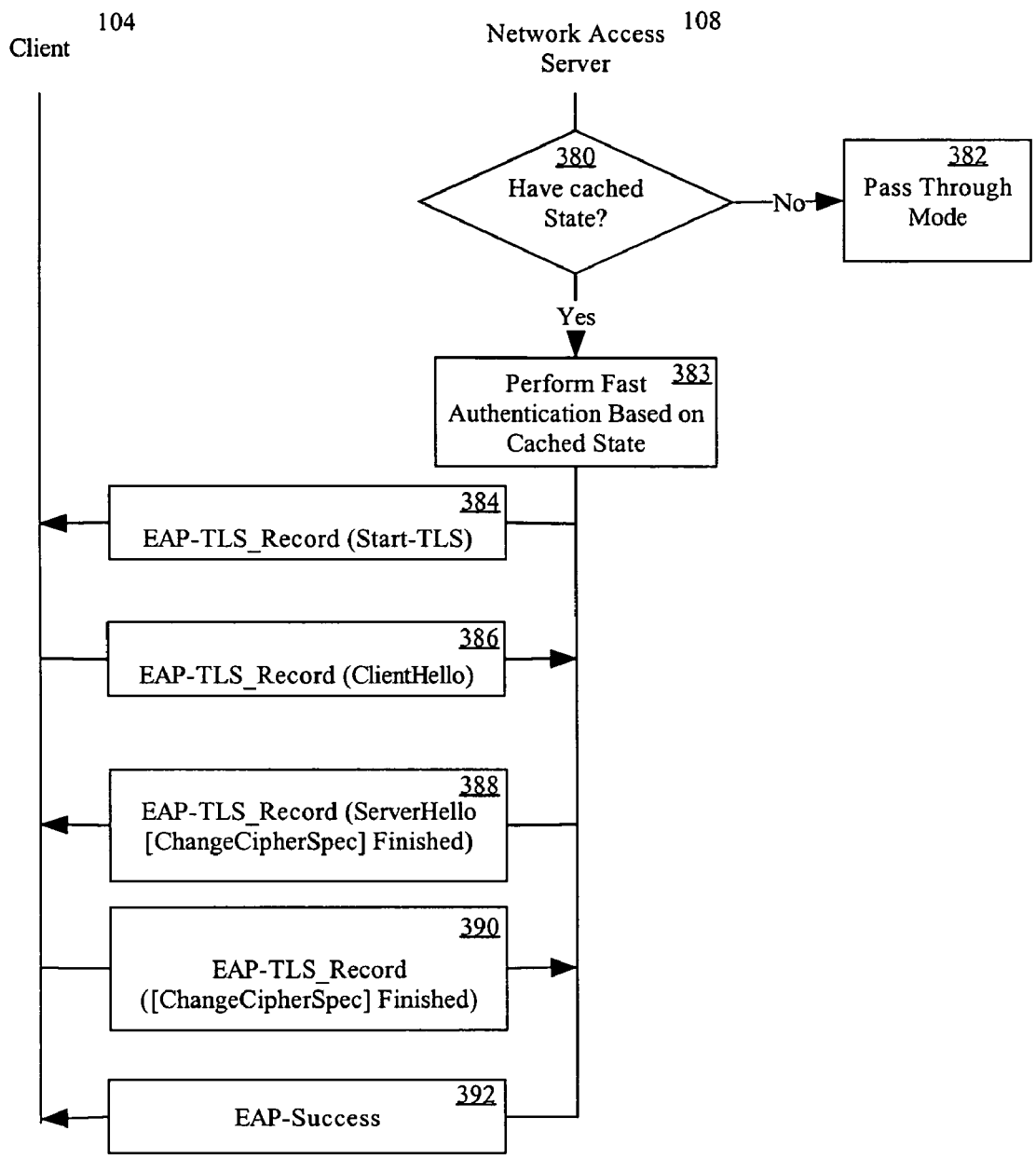
FIG. 3C is a diagram illustrating message transfer in a process of re-authenticating a computing device, in accordance with another embodiment.

FIG. 3C is a flow diagram, including message transfer, that illustrates another embodiment of a method for re-authenticating computing devices. The embodiment depicted in FIG. 3C passes messages that are substantially compliant with an EAP-TLS protocol. However, other embodiments may use other authentication methods and protocols. The flow diagram of FIG. 3C may be used to re-authenticate for the same session.

In block 380, the network access server 108 determines if it has cached state associated with the client 104 for this session. The network access server 108 may use the active network access session to determine if the cached state information is stored. If the network access server 108 does not have the cached state, the network access server 108 initiates a pass-through mode, in block 382. Details of one embodiment of a pass though mode are depicted in blocks 306-316 of FIG. 3A. The network access server 108 initiates the pass through mode by sending an access request to the authentication server 120, including the identity response, as depicted in block 308 of FIG. 3A.

If the network access server 108 determines, in block 380, that it has the cached state, then the access server performs the re-authentication of the client 104 based on the cached state data and without again contacting the authentication server 120, in block 383. Blocks 384-392 depict message flow during the re-authentication. In block 384, the network access server 108 sends an EAP-TLS record message to the client 104 containing a Start-TLS operation. In block 386, the client 104 sends an EAP-TLS record message to the network access server 108 containing a ClientHello.

In block 388, the network access server 108 sends to the client 104 a ServerHello message, a ChangeCipherSpec message to reactivate the session's security options, and a Finished message to let the client 104 check the newly activated security options.

In block 390, the client 104 responds with a ChangeCipherSpec message to reactivate the negotiated options, and a Finished message to let the network access server 108 check the newly activated security options.

In block 392, the network access server 108 sends an EAP-Success message to the client 104. This completes the re-authentication for the same session performed at the network access server 108.

2.4 Policy Change Updates to Access Server

When an administrator changes the policies, the authentication server 120 pushes this information to the network access server 108, in one embodiment. Depending on the nature of the changes, the authentication server 120 may provide updated policies and allow the session associated with the authentication server 120 to continue or require immediate invalidation of all or some of the sessions associated with the authentication server 120.

The updated policies can be sent to the network access server 108 in any convenient fashion. In one embodiment, the policies are transferred to the network access server 108 via a Change of Authorization ("CoA") request message, using the general format defined in RFC 3576.

Figure 4:
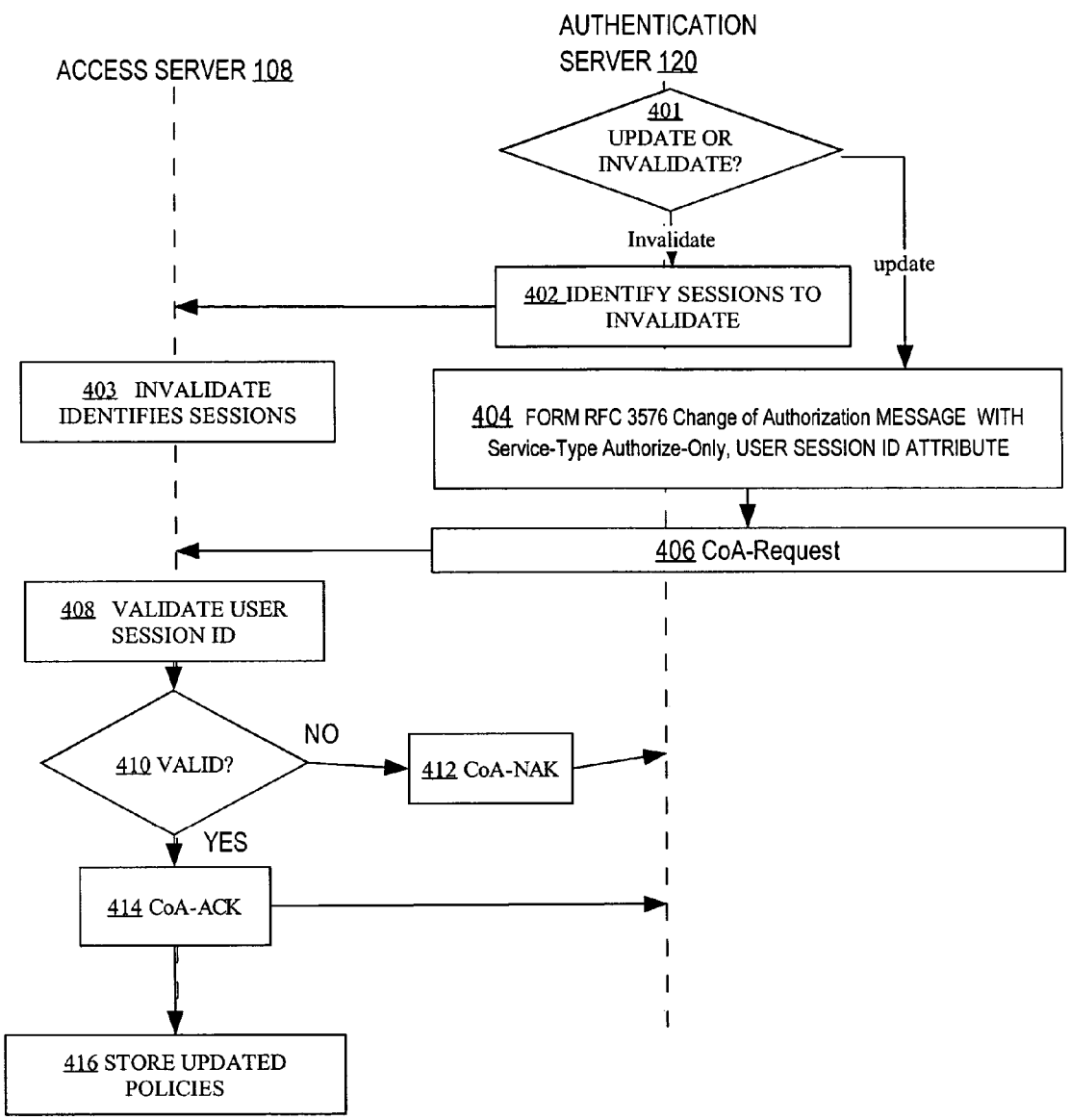
FIG. 4 is a diagram illustrating transferring policy updates to an access server, in accordance with an embodiment.

FIG. 4 is a flow diagram that illustrates an embodiment of pushing policy changes to a network access server 108. The present embodiment uses a Change of Authorization, as defined in RFC 3576; however, alternative embodiments may use other techniques for pushing policy updates to the access server 108.

In block 401, the authentication server 120 analyzes the policy changes to determine if the session should be invalidated or if the session can be continued with the updated policies. If the authentication server 120 determines that the session should be invalidated, the authentication server 120 indicates this to the access server 108, in block 402. In block 403, the access server 108 invalidates the identified sessions.

If the authentication server 120 determines, in block 401, that the session can be continued with the updated polices, then the authentication server 120 forms, in block 404, a Change of Authorization ("CoA") request message, using the general format defined in RFC 3576. Such a message has a RADIUS message type value of 43. The Service-Type value is set to Authorize-Only, the user session information is encoded in the additional attributes.

In one embodiment optimized for use with Cisco Network Admission Control (CNAC) components, the Cisco vendor-specific attribute (VSA) "service" may be included in the CoA Request in the form:

cisco-av-pair="aaa: service=IP.ADMISSION.REVALIDATE".

A VSA of this form expressly instructs a network access server 108 that is compliant with CNAC to perform re-validation.

In block 406, the CoA Request is sent as a RADIUS protocol message to network access server 108. In block 408, network access server 108 validates the user session information contained in the CoA Request to verify that the network access server 108 is actually engaged in a user session matching the provided user session information. If the user session information is valid, as tested in block 410, then in block 414, the network access server 108 sends a CoA acknowledge message (ACK), of the form defined in RFC 3576, back to the authentication server 120.

If the user session information is invalid, then a non-acknowledge (NAK) message is sent back, as shown in block 412. The ACK and NAK messages may have the form defined in RFC 3576.

In block 416, the network access server 108 stores the updated policies.

3.0 Implementation Mechanisms—Hardware Overview

Figure 5:
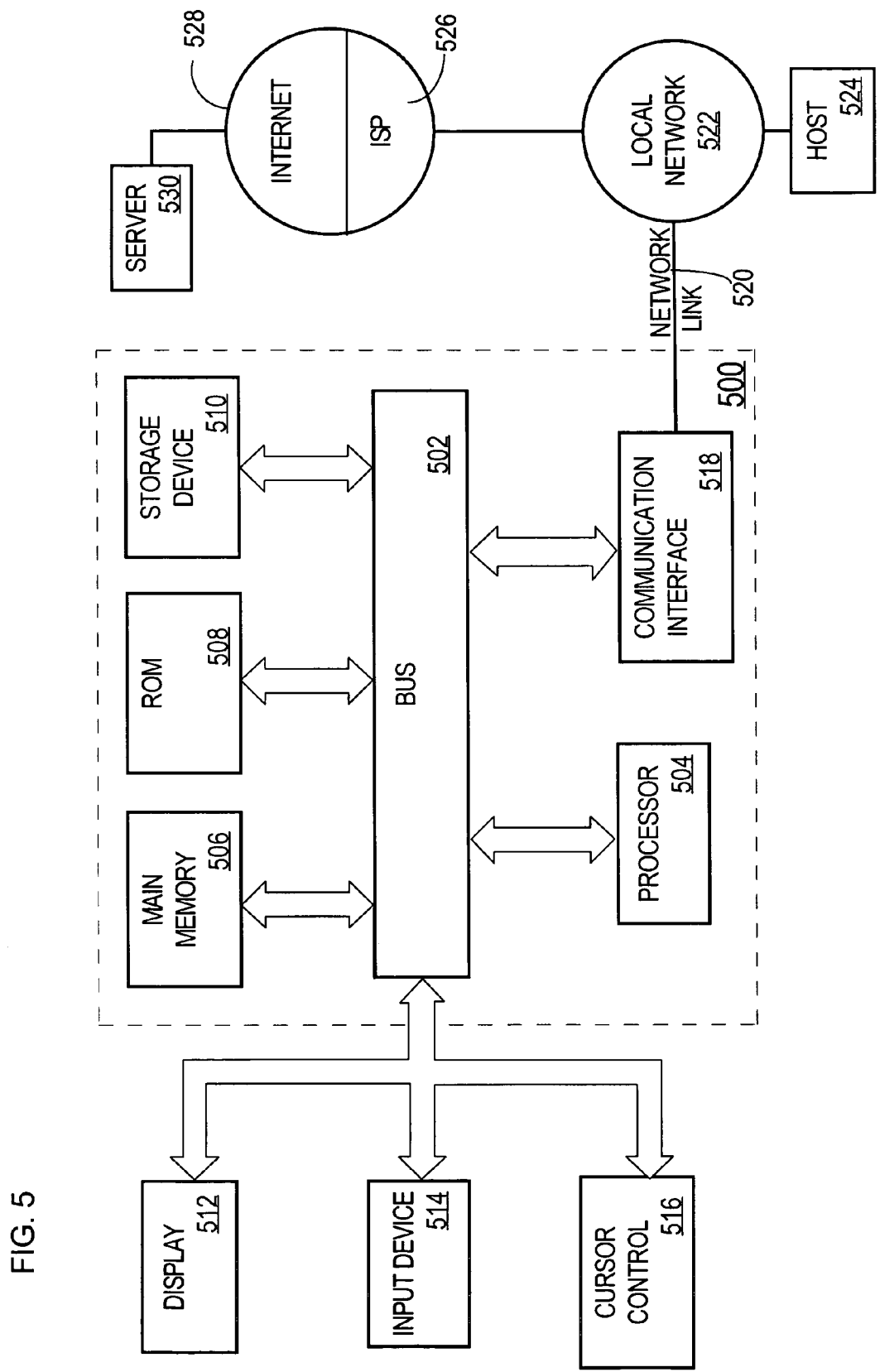
FIG. 5 is a block diagram that illustrates a computer system upon which an embodiment may be implemented.

FIG. 5 is a block diagram that illustrates a general-purpose computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for re-authenticating computing devices. According to one embodiment of the invention, re-authenticating computing devices is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for re-authenticating computing devices as described herein.

The received code may be executed by processor 504 as it is received, and/or stored in storage device 510, or other non-volatile storage for later execution.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of re-authenticating a computing device seeking access to a resource, the method comprising the computer-implemented steps of:
   receiving a first request from the computing device for authentication by a server comprising one or more processors;
   forwarding the first request received from the computing device to an authentication device to enable said authentication device to authenticate said computing device using a full-authentication mechanism for a first session, wherein state information related to authenticating said computing device for the first session is created;
   wherein the state information comprises one or more of:
      transport layer security (TLS) session ID;
      protected access credentials;
      cryptographic information;
      session expiration information;
      transport layer security (TLS) master secret;
      access control policies that indicate what type of access the computing device should have to protected resources;
   receiving said state information from said authentication device;
   the server storing said state information on a state cache accessible by the server;
   subsequent to termination of the first session:
   receiving a second request from the computing device for authentication by the server;
   re-authenticating said computing device for a second session, in response to said second request, using said stored state information without again contacting said authentication device;
   receiving, at an authenticator device, a third request for authentication from said computing device;
   determining that said authenticator device does not have valid state information for said computing device stored thereon; and
   responsive to the determination that said authenticator device does not have said valid state information, forwarding said third request for authentication from said authenticator device to said authentication device.

2. A method as recited in claim 1, wherein said authentication device is substantially compliant with an authentication server in an 802.1x architecture.

3. A method as recited in claim 1, wherein said re-authenticating is performed at an authenticator device that is substantially compliant with an authenticator in an 802.1x architecture.

4. A method as recited in claim 1, wherein said re-authenticating is performed at a network access point.

5. A method as recited in claim 1, wherein said re-authenticating said computing device comprises:
   determining that said state information for said computing device is stored and that said state information is valid.

6. A method as recited in claim 1, further comprising:
   receiving, at an authenticator device, a fourth request from said computing device for authentication;
   determining if said authenticator device has policies associated with authenticating said computing device;
   in response to determining that said authenticator device has said policies, initiating said re-authenticating said computing device at said authenticator device; and
   in response to determining that said authenticator device does not have said policies, forwarding said third request for authentication from said authenticator device to said authentication device.

7. A method as recited in claim 1, wherein said state information comprises the TLS session ID.

8. A method as recited in claim 1, wherein said state information comprises the cryptographic information.

9. A method as recited in claim 1, wherein said state information comprises expiration information for the first session associated with said authenticating said computing device to said authentication device.

10. A method as recited in claim 1, wherein said state information comprises access control policies.

11. A method as recited in claim 1, wherein said receiving said state information comprises receiving said state information in a message used in authentication handshaking.

12. A method as recited in claim 1, wherein said receiving said state information comprises receiving a RADIUS change of authorization request message.

13. A method as recited in claim 1, wherein said receiving said state information is in response to a request from an authenticator device for said state information.

14. A method as recited in claim 1, further comprising invalidating said stored state information responsive to a directive from said authentication device.

15. A method as recited in claim 1, further comprising receiving a policy change from said authentication device.

16. A method as recited in claim 1, further comprising an authenticator device invalidating said stored state information responsive to a session timeout.

17. A method as recited in claim 1, wherein said authentication device does not store said state information for the duration of the first session associated with said authenticating said computing device.

18. A method as recited in claim 8, wherein said cryptographic information comprises the Transport Layer Security (TLS) master secret.

19. A method as recited in claim 11, wherein said message is an access-accept message in a Transport Layer Security (TLS) protocol.

20. An apparatus for authenticating a computing device over a network, said apparatus comprising:
   a network interface that is coupled to the network for receiving one or more packet flows therefrom;
   a processor; and
   a computer readable medium having stored thereon one or more sequences of instructions which, when executed by the processor, cause the processor to carry out the steps of:
      receiving a first request from the computing device for authentication;
      forwarding the first request received from the computing device to an authentication device to enable said authentication device to authenticate said computing device using a full-authentication mechanism for a first session, wherein state information related to authenticating said computing device for the first session is created;
      wherein the state information comprises one or more of:
         TLS session ID;
         protected access credentials;
         cryptographic information;
         session expiration information;
         transport layer security (TLS) master secret;
         access control policies that indicate what type of access the computing device should have to protected resources;

receiving said state information from said authentication device;

storing said state information by the apparatus on a state cache;

subsequent to termination of the first session:

receiving a second request from the computing device for authentication;

re-authenticating said computing device for a second session, in response to said second request, using said stored state information without again contacting said authentication device;

receiving, at an authenticator device, a third request for authentication from said computing device;

determining that said authenticator device does not have valid state information for said computing device stored thereon; and responsive to the determination that said authenticator device does not have said valid state information, forwarding said third request for authentication from said authenticator device to said authentication device.

21. An apparatus as recited in claim 20, wherein said instructions, when executed by the processor, cause the processor to carry out the further steps of:

receiving a third request for authentication from said computing device;

responsive to receiving said second request, determining if said state information is stored in said computer readable medium;

responsive to a determination that said state information is not stored in said computer readable medium, forwarding said third request for authentication to the authentication device; and responsive to a determination that said state information is stored in said computer readable medium, re-authenticating said computing device using said stored state information.

22. A computer readable medium, comprising volatile or non-volatile media, having stored thereon one or more sequences of instructions which, when executed by a processor, cause the processor to carry out the steps of:

receiving a first request for authentication from a computing device;

forwarding the first request received from the computing device to an authentication device to enable said authentication device to authenticate said computing device using a full-authentication mechanism for a first session, wherein state information related to authenticating said computing device for the first session is created;

wherein the state information comprises one or more of:
TLS session ID;
protected access credentials;
cryptographic information;
session expiration information;
transport layer security (TLS) master secret;
access control policies that indicate what type of access the computing device should have to protected resources;

receiving said state information from said authentication device;

storing said state information by a server on a state cache;

subsequent to termination of the first session:

receiving a second request for authentication from said computing device;

responsive to receiving said second request, re-authenticating said computing device, for a second session, using said stored state information without contacting said authentication device;

receiving, at an authenticator device, a third request for authentication from said computing device;

determining that said authenticator device does not have valid state information for said computing device stored thereon; and responsive to the determination that said authenticator device does not have said valid state information, forwarding said third request for authentication from said authenticator device to said authentication device.

23. An apparatus for authenticating a computing device, comprising:

one or more processors;

means for receiving a first request for authentication from a computing device;

means for forwarding said first authentication request to an authentication device to enable said authentication device to authenticate said computing device using a full-authentication mechanism for a first session, wherein state information related to authenticating said computing device for the first session is created;

wherein the state information comprises one or more of:
TLS session ID;
protected access credentials;
cryptographic information;
session expiration information;
transport layer security (TLS) master secret;
access control policies that indicate what type of access the computing device should have to protected resources;

means for receiving said state information from said authentication device;

means for storing said state information on a state cache accessible by the apparatus;

subsequent to termination of the first session:

means for receiving a second request for authentication from said computing device;

means for re-authenticating said computing device for a second session, responsive to said second request, using said stored state information without contacting said authentication device;

means for receiving, at an authenticator device, a third request for authentication from said computing device;

means for determining that said authenticator device does not have valid state information for said computing device stored thereon; and means for, responsive to the determination that said authenticator device does not have said valid state information, forwarding said third request for authentication from said authenticator device to said authentication device.

24. A network for authenticating a computing device, the network comprising:

an authentication device; and an authenticator device communicatively coupled to said authentication device;

wherein said authentication device is operable to:
authenticate said computing device using a full-authentication mechanism for a first session, wherein state information related to said authenticating said computing device is created; and wherein the state information comprises one or more of:
    TLS session ID;
    protected access credentials;
    cryptographic information;
    session expiration information;
    transport layer security (TLS) master secret;
    access control policies that indicate what type of access the computing device should have to protected resources;
    transfer said state information to the authenticator device; and
wherein said authenticator device is operable to:
    store said state information on said authenticator device; and
    subsequent to termination of the first session:
    re-authenticate said computing device at said authenticator device, for a second session, using said state information stored on said authenticator device;
    receive a third request for authentication from said computing device;
    determine that said authenticator device does not have valid state information for said computing device stored thereon; and
    responsive to the determination that said authenticator device does not have said valid state information, forward said third request for authentication from said authenticator device to said authentication device.

25. A network as recited in claim 24, wherein said authenticator device is further operable to:
    receive a request for authentication from said computing device;
    determine if state information that is usable for a re-authentication of said computing device is stored at said authenticator device;
    forward said authentication request to the authentication device responsive to a determination that said state information is not stored at said authenticator device; and
    re-authenticate said computing device at said authenticator device responsive to a determination that said state information is stored at said authenticator device.

* * * * *